United States Patent
Barnes

(10) Patent No.: US 11,514,366 B2
(45) Date of Patent: Nov. 29, 2022

(54) SYSTEM FOR CONTENT ENCRYPTION FOR PREDICTIVE MODELS TRAINED ON PRIVATE DATA

(71) Applicant: Microsoft Technology Licensing, LLC, Redmond, WA (US)

(72) Inventor: Christopher Barnes, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 267 days.

(21) Appl. No.: 17/010,047

(22) Filed: Sep. 2, 2020

(65) Prior Publication Data
US 2022/0067574 A1 Mar. 3, 2022

(51) Int. Cl.
| | |
|---|---|
| *G06F 15/16* | (2006.01) |
| *G06N 20/00* | (2019.01) |
| *G06K 9/62* | (2022.01) |
| *G06F 16/9535* | (2019.01) |
| *G06N 5/04* | (2006.01) |
| *G06F 21/62* | (2013.01) |

(52) U.S. Cl.
CPC ......... *G06N 20/00* (2019.01); *G06F 16/9535* (2019.01); *G06F 21/6218* (2013.01); *G06K 9/6256* (2013.01); *G06N 5/04* (2013.01)

(58) Field of Classification Search
CPC ...... G06N 20/00; G06N 5/04; G06F 16/9535; G06F 21/6218; G06K 9/6256

USPC .......................................................... 709/200
See application file for complete search history.

(56) References Cited

U.S. PATENT DOCUMENTS

| | | | |
|---|---|---|---|
| 11,362,803 B2* | 6/2022 | Kar | ........................ H04L 9/008 |
| 2019/0294805 A1 | 9/2019 | Taylor et al. | |
| 2019/0362083 A1* | 11/2019 | Ortiz | .................. G06F 21/6245 |
| 2020/0019697 A1 | 1/2020 | Shen et al. | |
| 2020/0082270 A1 | 3/2020 | Gu et al. | |
| 2020/0125762 A1 | 4/2020 | Xie et al. | |
| 2020/0143267 A1 | 5/2020 | Gidney | |
| 2020/0193292 A1 | 6/2020 | Weng et al. | |
| 2020/0313849 A1* | 10/2020 | Kar | .......................... G06N 3/08 |
| 2022/0058489 A1* | 2/2022 | Volkovs | ............... G06N 3/0472 |

* cited by examiner

*Primary Examiner* — Moustafa M Meky
(74) *Attorney, Agent, or Firm* — Calfee, Halter & Griswold LLP

(57) ABSTRACT

A computing system receives decrypts learned parameters of a computer-implemented predictive model stored in a computer-readable, non-volatile data store upon instantiation of a model process in volatile memory of the computing system. The predictive model is parameterized by learned parameters that are based upon private data of a user, wherein the learned parameters of the predictive model have been encrypted subsequent to training of the predictive model based upon the private data of the user. The computing system receives a request for a prediction associated with the user. Upon authorizing the request, the computing identifies the predictive model. The computing system, by way of the model process, generates the prediction based upon the request and the predictive model. The computing system outputs the prediction to a computing device associated with the user.

20 Claims, 8 Drawing Sheets

SYSTEM FOR CONTENT ENCRYPTION FOR PREDICTIVE MODELS TRAINED ON PRIVATE DATA

BACKGROUND

The security of private, computer-readable data (e.g., medical data, research data, web browsing histories, etc.) of a user (e.g., an individual user, an organization such as a corporation, etc.) may be of great importance to the user. As such, due to demand for privacy, as well as legal requirements for the protection of certain forms of private data, various data encryption, data retention, and data access authorization schemes have been employed to prevent unauthorized parties from accessing private data of users.

A predictive model comprises computer-executable code that is configured to output a prediction based upon parameters of the predictive model and input data provided to the model, wherein some of the parameters are learned based upon training data upon which the predictive model has been trained. A predictive model can be trained based upon training data that is not specific to a particular user and is generally publicly accessible. An example of a predictive model that is trained based upon publicly accessible training data is a speech recognition model that is trained based upon labeled speech data from a large number of different users. Alternatively, a predictive model can be trained based upon training data that is specific to particular user and is private to the particular user. An example of a predictive model that is trained based upon private data is a recommendation model that recommends products to an individual based upon products previously purchased by the individual and/or products previously viewed by the individual. When the user is a corporation, the private data may be data that is private to the corporation, the predictive model may be trained upon the data that is private to the corporation, and the predictive model may be used on behalf of employees or customers of the corporation.

While a predictive model trained based upon private data of a user may not include the private data itself, learned parameters of the predictive model represent an "understanding" of the private data. Thus, if an unauthorized party was able to gain access to a predictive model that was trained based upon private data of a user, the unauthorized party may be able to infer information about the user by executing the predictive model, wherein the inferred information may be perceived by the user to be private, and wherein such information can be inferred even though the predictive model does not include the private data itself. In an example, a predictive model may be trained to predict query completions for an individual based upon prior queries submitted to the search engine by the individual (where the prior queries are private data). Thus, when the predictive model receives a query prefix from the individual, such as "How do I treat . . . ", the predictive model may output "Disease X" based upon the input query prefix and the learned parameters of the model. If an unauthorized party was able to gain access to and execute the predictive model, by setting forth various inputs to the predictive model, the unauthorized party may be able to glean information about the individual that the individual holds private (such as, for example, that the individual likely suffers from Disease X). Accordingly, it is desirable to secure predictive models that have been trained based upon private data of a user from unauthorized access.

As noted above, various data encryption, data retention, and data access authorization schemes have been employed to prevent unauthorized access to private data of a user; however, such schemes are not well-suited for the protection of predictive models that have been trained based upon private data of the user. For instance, a developer that develops a predictive model may need transparent access to non-private portions of the predictive model; however, conventional schemes may be unable to provide such access while at the same time protecting privacy of the user.

SUMMARY

The following is a brief summary of subject matter that is described in greater detail herein. This summary is not intended to be limiting as to the scope of the claims.

Disclosed herein are various technologies pertaining to securely managing computer-implemented predictive models that have been trained based upon private data. With more specificity, a predictive application is disclosed herein that facilitates the secure storage and execution of a computer-implemented predictive model, wherein the predictive model is parameterized by learned parameters, and further wherein the learned parameters are learned are based upon private data of a user (e.g., an individual, an organization such as a corporation, etc.) The predictive model, when executed, is configured to output a prediction that is associated with the user. While the examples set forth herein relate to predictive models with learned parameters that output predictions, the technologies described herein are not limited to predictive models. Rather, the technologies described herein are applicable to any data that may be deemed as being private by a user, wherein such data is accessible to a computer-executable process.

In operation, the predictive application executes on a computing system, and the predictive application receives an indication that a computer-implemented predictive model associated with a user is to be securely stored. The predictive model is parameterized by learned parameters and includes execution code, wherein the execution code includes design parameters. Additionally, the predictive model is configured to output a prediction associated with the user based upon input data. The predictive model has been trained based upon private data of the user, and hence the learned parameters of the predictive model are based upon the private data of the user and reflect information about the user that the user may deem to be private. The execution code facilitates execution of the predictive model. In an example, the predictive model may be a deep neural network (DNN) that comprises an input layer, an output layer, and several hidden layers between the input layer and the output layer, wherein each of the layers comprises nodes, and nodes in adjacent layers in the DNN are connected by edges having weights assigned thereto. In the example, the weights are the learned parameters, as the weights are learned based upon the private data of the user. In contrast, and continuing with the DNN example, a number of hidden layers, a number of nodes in the input layer, a number of nodes in the output layer, and a number of nodes in the hidden layers are design parameters of the predictive model set forth by a developer of the predictive model. In a non-limiting example, the private data of the user may be prior queries submitted to a search engine by the user, the input data may be a query prefix being input to the search engine by the user as part of a query, and the prediction may be a query completion that are predicted to be input to the search engine as part of the query.

After receiving the indication that the computer-implemented predictive model is to be securely stored, the predictive application creates an (initially) empty file within a (non-volatile) computer-readable data store and marks the file as "to-be-encrypted". The predictive application also creates metadata (e.g., an identifier for the predictive model, an identifier for the user, etc.) for the predictive model and stores the metadata in the data store. Upon detecting that the file has been marked as to-be-encrypted, an operating system (OS) of the computing system generates, in (volatile) memory of the computing system, a content key. The OS of the computing system encrypts the learned parameters of the predictive model based upon the content key.

Subsequent to encrypting the learned parameters of the predictive model, the OS of computing system transmits an encryption request to the predictive application, wherein the encryption request includes the content key. The predictive application obtains a model key for the content key based upon the encryption request, wherein the model key is retained in the memory of the computing system (and not in the data store of the computing system), and further wherein the model key is unique to the predictive model. In an exemplary embodiment, the predictive application generates the model key. In another exemplary embodiment, the predictive application receives the model key from a computing device associated with the user over a secured and authenticated pipeline. The predictive application encrypts the content key based upon the model key, thereby generating an encrypted content key, and returns the encrypted content key to the OS of the computing system. The (original, unencrypted) content key is discarded by both the OS and the predictive application (e.g., the OS discards the content key upon transmitting the content key to the predictive application, and the predictive application discards the content key subsequent to the generation of the encrypted content key).

Before discarding the content key, the OS encrypts the learned parameters and writes the encrypted learned parameters to the file (previously marked as "to-be-encrypted") stored in the data store, while the computer-executable code of the predictive model remains unencrypted. Thus, in the data store, the predictive model comprises the file (that comprises the encrypted learned parameters) and the unencrypted execution code. The OS also stores the encrypted content key received from the predictive application as metadata for the file. The learned parameters remain encrypted in the file until an authorized process attempts to read from the file.

Decryption of the encrypted learned parameters stored in the file is now described. Subsequent to the encrypted learned parameters being stored within the file, the predictive application receives a request to instantiate a model process for the predictive model. The predictive application instantiates the model process in the memory of the computing system, and the model process initiates execution based upon the execution code of the predictive model. For instance, the predictive application may cause the model process to be instantiated upon receiving a request from a computing device associated with the user. Upon receiving the request to instantiate the model process, the predictive application generates, in the memory of the computing system, model-process data for the predictive model. The model-process data includes an identifier for the predictive model and an identifier for the model process instantiated in the memory.

When the model process is instantiated in the memory of the computing system, the predictive application causes the encrypted learned parameters of the predictive model to be decrypted. With more specificity, upon instantiation, the model process attempts to read from the file (marked as "encrypted") stored in the data store. The OS of the computing system detects that the model process is attempting to read from the file and transmits a decryption request to the predictive application, wherein the decryption request includes an identifier for the model process and metadata assigned to the file, wherein the metadata includes the encrypted content key.

Upon receiving the decryption request, the predictive application identifies the predictive model based upon a mapping between the identifier for the model process and the model. Upon identifying the predictive model, the predictive application validates that the model process has permission to read from the file that stores the learned parameters based upon the model-process data stored in the memory. Upon validating the model process, the predictive application retrieves the model key (which is stored in the memory of the computing system). The predictive application then decrypts, based upon the model key, the encrypted content key included in the decryption request, thereby generating the (decrypted) content key. The predictive application provides the content key to the OS of the computing system. The OS decrypts the (encrypted) learned parameters in the file using the content key, therefore rendering the learned parameters accessible to the model process.

The predictive application may then receive a query (i.e., a request for a prediction) from a computing device that is associated with the user (or an authorized party of the user). The query comprises input data, an identifier for the predictive model, and an identifier for the user. Upon receiving the query, the predictive application authorizes the query. With more specificity, the predictive application determines, based upon the identifier for the user included in the query, that the user is authorized to invoke the predictive model. Upon authorization of the query, the predictive application then transmits the query to the model process, whereupon the model process executes the query (i.e., generates the prediction). With more specificity, the model process inputs the input data included in the query to the predictive model, and, based upon the input data and the learned parameters of the predictive model (as well as the overall structure of the model as set forth in the design parameters), the model process outputs the prediction. For instance, the model process may return the prediction to the predictive application, which in turn transmits the prediction to the computing device associated with the user (or another computing device).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
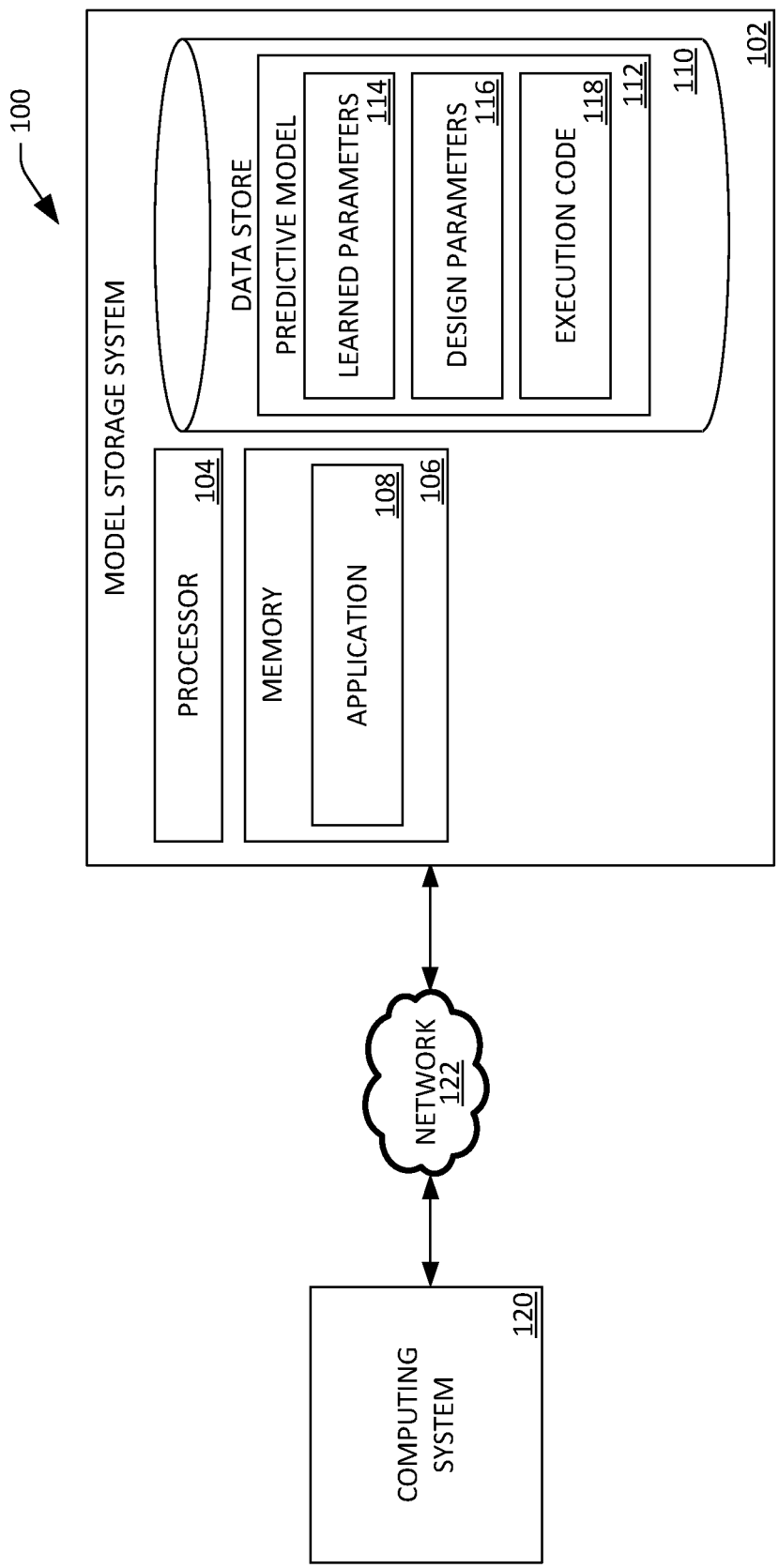
FIG. 1 is a functional block diagram of an exemplary computing environment that facilitates securely storing a computer-implemented predictive model that has been trained based upon private data of a user.

Various technologies pertaining to securely managing computer-implemented predictive models that have been trained based upon private data of a user are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

In operation, a predictive application executes on a computing system, and the predictive application receives a message that a computer-implemented predictive model associated with a user is to be securely stored. The predictive model is parameterized by learned parameters and includes execution code, wherein the execution code includes design parameters. The predictive model is configured to output a prediction associated with the user based upon input data. The predictive model has been trained based upon private data of the user, and hence the learned parameters of the predictive model are based upon the private data of the user and reflect information about the user that the user may deem to be private. The execution code facilitates execution of the predictive model.

After receiving the message that the computer-implemented predictive model is to be securely stored, the predictive application creates an (initially) empty file within a (non-volatile) computer-readable data store and marks the file with an indication that the file is "to-be-encrypted". The predictive application also creates metadata for the predictive model. For instance, the metadata may include an identifier for the predictive model and an identifier for the user. The predictive application stores the metadata in the data store. Upon detecting that the file has been marked with the "to-be-encrypted" indication, an operating system (OS) of the computing system generates, in (volatile) memory of the computing system, a content key. The OS of the computing system encrypts the learned parameters of the predictive model based upon the content key. After encrypting the learned parameters of the predictive model, the OS of computing system generates and transmits an encryption request to the predictive application, wherein the encryption request includes the content key that was generated by the OS. The predictive application obtains a model key for the content key based upon the encryption request, wherein the model key is retained in the memory of the computing system (and not in the data store of the computing system), and further wherein the model key is unique to the predictive model. The predictive application encrypts the content key based upon the model key, thereby generating an encrypted content key. The predictive application transmits the encrypted content key to the OS of the computing system. The OS and the predictive application both discard the (original, unencrypted) content key. Before discarding the content key, the OS of the computing system encrypts the learned parameters and writes the encrypted learned parameters to the file (previously marked with the "to-be-encrypted" indication) stored in the data store, while the execution code of the predictive model remains unencrypted. Thus, in the data store, the predictive model comprises the file (that comprises the encrypted learned parameters) and the unencrypted execution code. The OS also stores the encrypted content key received from the predictive application as metadata for the file. The learned parameters remain encrypted in the file until an authorized model process attempts to read from the file.

Decryption of the encrypted learned parameters stored in the file is now described. Subsequent to the encrypted learned parameters being stored within the file, the predictive application receives a request to instantiate a model process for the predictive model. The predictive application instantiates the model process in the memory of the computing system, and the model process initiates execution based upon the execution code of the predictive model, which is stored in the data store. Upon receiving a request to instantiate the model process, the predictive application generates, in the memory of the computing system, model-process data for the predictive model. The model-process data comprises an identifier for the predictive model and an identifier for the model process instantiated in the memory. When the model process is instantiated in the memory of the computing system, the predictive application causes the encrypted learned parameters of the predictive model to be decrypted. With more specificity, upon instantiation, the model process attempts to read from the file (marked as "encrypted") stored in the data store. The OS of the computing system detects that the model process is attempting to read from the file. The OS generates and transmits a decryption request to the predictive application, wherein the decryption request includes an identifier for the model process and the metadata assigned to the file, wherein the metadata includes the encrypted content key. Upon receiving the decryption request, the predictive application identifies the predictive model based upon a mapping between the identifier for the model process and the model. Upon identifying the predictive model, the predictive application validates that the model process has permission to read from the file that stores the (encrypted) learned parameters based upon the model-process data stored in the memory. Upon validating the model process, the predictive application retrieves the model key (which is stored in the memory of the computing system). The predictive application then decrypts, based upon the model key, the encrypted content key included in the decryption request, thereby generating the (decrypted) content key. The predictive application transmits the content key to the OS of the computing system. The OS decrypts the (encrypted) learned parameters in the file using the content key, therefore rendering the learned parameters accessible to the model process.

Subsequent to decryption of the learned parameters, a computing device that is associated with the user (or an authorized party of the user) may transmits a query (i.e., a request for a prediction) to the predictive application may then receive a query. The query includes input data, an identifier for the predictive model, and an identifier for the user. The predictive application authorizes the query upon receiving the query. With more specificity, the predictive application determines, based upon the identifier for the user included in the query, that the user is authorized to invoke the predictive model. Upon authorization of the query, the predictive application then transmits the query to the model process, whereupon the model process executes the query (i.e., generates the prediction). With more specificity, the model process provides the input data included in the query as input to the predictive model, and, based upon the input data and the learned parameters of the predictive model (as well as the overall structure of the model as set forth in the design parameters of the predictive model), the model process outputs the prediction. For instance, the model process may transmit the prediction to the predictive application. The predictive application may then transmit the prediction to the computing device associated with the user (or another computing device).

The above-described technologies provide for the secure storage and execution of predictive models that have been trained based upon private data of a user. The above-described technologies solve the technical problem of providing transparent access to non-private portions of a predictive model while at the same time protecting private portions of the predictive model from unauthorized access, and hence demonstrate a technical effect. Vis-à-vis the encryption/decryption processes described above, model processes running on the same computing system are only able to access learned parameters of predictive models stored on the computing system that they are authorized to access. Additionally, as only learned parameters of the predictive model are encrypted, the above-described technologies facilitate development and maintenance of predictive models, as the non-private aspects of the predictive model are transparent to developers, and the private aspects of the predictive model are hidden from the developers. In other words, while developers retain access to the execution code of the predictive model, developers are unable to access the learned parameters. The learned parameters of the predictive models are also protected from unauthorized model processes and/or unauthorized OSs, as the (unencrypted) learned parameters may only be accessed using a (decrypted) content key which can only be produced by the predictive application. Furthermore, the above-described technologies do not require developers to invoke or develop data access shims for encryption or decryption, nor do the above-described technologies rely on access control lists (ACLs) or other OS-dependent permission settings.

Referring now to FIG. 1, an exemplary computing environment 100 is illustrated that facilitates secure storage of a computer-implemented predictive model that has been trained based upon private data of a user. The computing environment 100 includes a model storage system 102. The model storage system 102 comprises a processor 104 and memory 106. The memory 106 may include an application 108, wherein the application 108 is configured to transmit computer-implemented predictive models across networks.

The model storage system 102 further comprises a data store 110 that is configured to store predictive models according to the data security/retention policies and/or preferences of a user. The user may be an individual user, a group of individual users, and/or an organization (e.g., a corporation). The data store 110 comprises a computer-implemented predictive model 112 that has been trained based upon private data (not shown in FIG. 1) of the user, that is, data that is not available to the public at large and that is only available to the user and/or authorized parties of the user. The predictive model 112 may be trained by the model storage system 102 or the predictive model 112 may be trained by another computing device (not shown in FIG. 1) and the model storage system 102 may subsequently receive and store the predictive model 112 in the data store 110.

The predictive model 112 is parameterized by learned parameters 114, wherein the learned parameters 114 are based upon the private data of the user. In an example, the private data of the user may be data that is subject to legal protections, such as health data covered under the Health Insurance Portability and Accountability Act of 1996 (HIPAA). In another example, the private data of the user may be data that has been received by a website visited by the user. The predictive model 112 also includes execution code 116 that facilitates execution of the predictive model 112. The execution code 116 includes design parameters 118 that are defined by a developer of the predictive model 112 and relate to a structure of the predictive model 112.

The predictive model 112, when executed by a processor, is generally configured to output a prediction associated with the user based upon input data. In an embodiment, the prediction may be a label (i.e., the predictive model 112 may be a classification model) or the prediction may be a numerical value (i.e., the predictive model 112 may be a regression model). The predictive model 112 may be or include an algorithm that includes hard-coded parameters that are based upon the private data of a user. In an example, the predictive model 112 may be a neural network, such as a deep neural network (DNN). In another example, the predictive model 112 may be a decision tree, such as a gradient-boosted decision tree. In yet another example, the predictive model 112 may be or include ensemble methods. In an example, the private data of the user may be prior queries submitted to a search engine by the user, the input data may be a query prefix being input to the search engine by the user as part of a query, and the prediction may be a query completion that are predicted to be input to the search engine as part of the query.

In an example, the predictive model 112 may be a DNN that comprises an input layer, an output layer, and several hidden layers between the input layer and the output layer, wherein each of the layers comprises nodes, and nodes in adjacent layers in the DNN are connected by edges having weights assigned thereto. In the example, the weights are the learned parameters 114, as the weights are learned based upon the private data of the user. In contrast, and continuing with the DNN example, a number of hidden layers, a number of nodes in the input layer, a number of nodes in the output layer, and a number of nodes in the hidden layers are the design parameters 118.

The computing environment 100 further includes a computing system 120 that is in communication with the model storage system 102 by way of a network 122 (e.g., the Internet, intranet, etc.). In an embodiment, the computing system 120 may be a cloud-based computing platform. As will be described in greater detail below, the computing system 120 is configured to provide for the secure storage and execution of computer-implemented predictive models that have been trained based upon private data of users.

Figure 2:
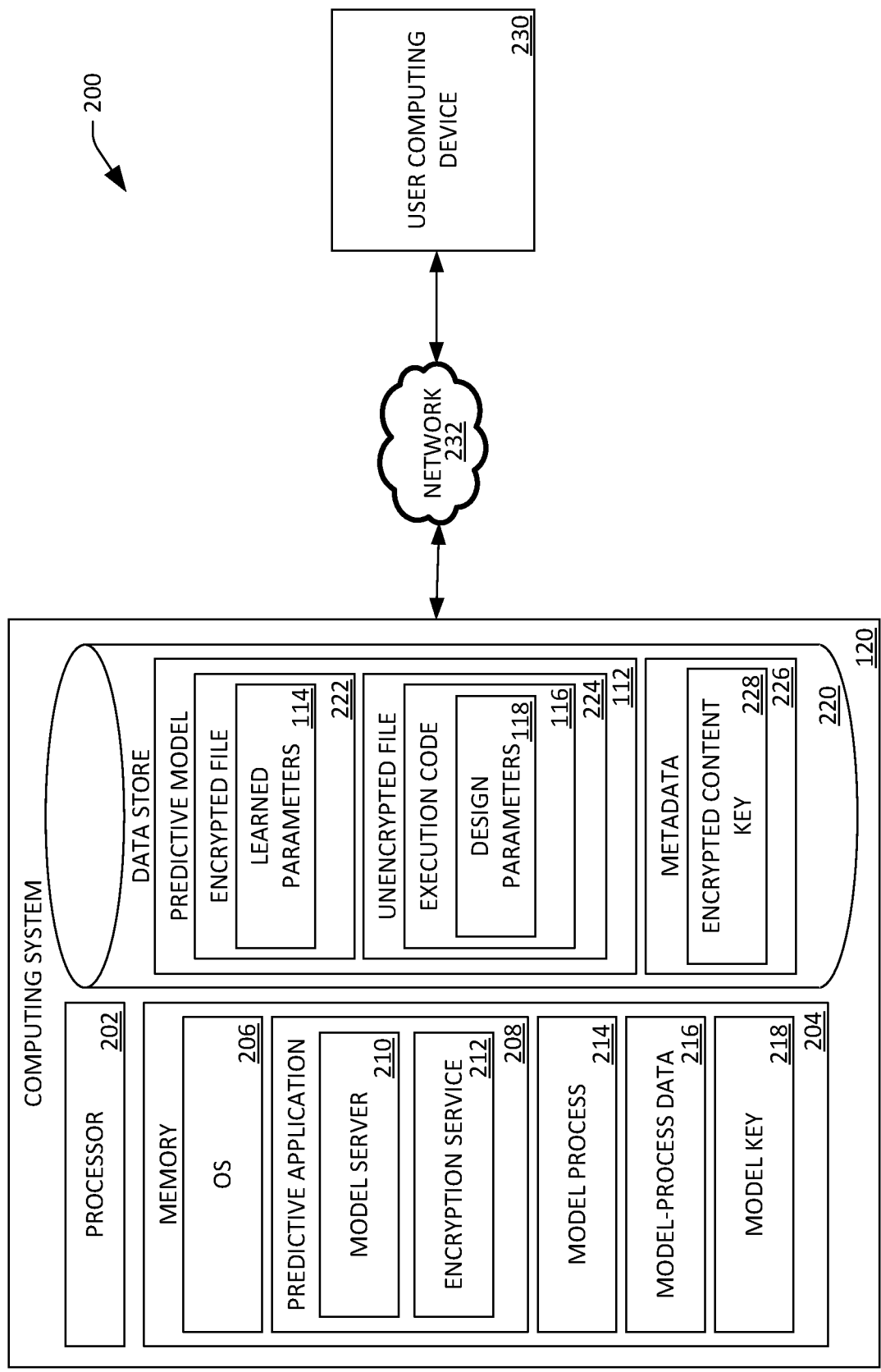
FIG. 2 is a functional block diagram of an exemplary computing environment that facilitates generating predictions via a computer-implemented predictive model that has been trained based upon private data of a user.

With reference now to FIG. 2, a computing environment 200 is illustrated which facilitates generating a prediction via a computer-implemented predictive model trained based upon private data of a user. The computing environment 200 includes the computing system 120. The computing system 120 comprises a processor 202 and (volatile) memory 204. The memory 204 includes an operating system (OS) 206 loaded therein. In general, the OS 206, when executed by the processor 202, is configured to, inter alia, read and write to files that are maintained by the computing system 120. The OS 206 can also encrypt and decrypt data stored at the computing system 120.

The memory 204 includes a predictive application 208. In general, the predictive application 208, when executed by the processor 202, is configured to facilitate the secure storage and execution of computer-implemented predictive models that have been trained based upon private data of users. The predictive application 208 is also configured to maintain information as to which users are authorized to invoke which predictive models. In an embodiment, the predictive application 208 comprises a model server 210 and an encryption service 212. In the embodiment, and as will be described in greater detail below, the model server 210 is configured to manage model processes associated with predictive models and to route queries to the model process upon authorizing the queries, wherein the queries are requests for predictions. In the embodiment, and as will be described in greater detail below, the encryption service 212 is configured to facilitate the encryption/decryption of learned parameters of predictive models that have been trained based upon private data of users.

The memory 204 also includes a model process 214. The model process 214, when executed by the processor 202, is configured to execute a predictive model. Although not depicted in FIG. 2, it is to be understood that the memory 204 may include a plurality of model processes that are each responsible for the execution of different predictive models, which may be associated with different users.

The memory 204 includes model-process data 216 that is maintained in the memory 204 by the predictive application 208. The model-process data 216 include identifiers for predictive models and identifiers for model processes (e.g., the model process 214). The memory 204 also includes a model key 218 which will be described in detail below.

The computing system 120 further includes a computer-readable, non-volatile data store 220 that, in contrast to the memory 204, is configured for persistent storage of data. In an embodiment, the data store 220 may be cloud-based storage. The data store 220 includes the predictive model 112, however, as will be explained in greater detail below, a portion of the predictive model 112 is encrypted in the data store 220. As such, the predictive model 112 in the data store 220 comprises an encrypted file 222, wherein the encrypted file 222 includes the (encrypted) learned parameters 114. The predictive model 112 also comprises an unencrypted file 224, wherein the unencrypted file 224 comprises the execution code 116.

The data store 220 also stores metadata 226 for the predictive model 112. The metadata 226 for the predictive model 112 may include an identifier for the encrypted file 222, an identifier for the model process 214, an identifier for the user, etc. The data store 220 also stores an encrypted content key 228 for the encrypted file 222, which will be explained in greater detail below. In an embodiment, the encrypted content key 228 may be included in the metadata 226 stored in the data store 220. In another embodiment, the encrypted content key 228 may be stored in the data store 220 separately from the metadata 226. Although not depicted in FIG. 2, it is to be understood that the data store 220 may store different files (and hence, different predictive models, including encrypted learned parameters and execution code) for different users, as well as metadata and encrypted content keys for the different files.

As shown in FIG. 2, the computing environment 200 also includes a user computing device 230 that is in communication with the computing system 120 by way of a network 232 (e.g., the Internet, intranet, etc.) Although not illustrated in FIG. 2, it is to be understood that the user computing device 230 includes computing components, such as a processor, memory, a data store, a display, input devices, etc. In an embodiment, the user computing device 230 may be a server computing device associated with an organization, wherein the server computing device is in communication with a client computing device that is operated by an individual user. In another embodiment, the user computing device 230 may be a computing device operated by a user who is an individual user, such as a desktop computing device, a laptop computing device, a tablet computing device, a smartphone, etc.

With reference generally now to FIGS. 1 and 2, operation of the computing environment 100 and the computing environment 200 is now set forth. The predictive application 208 receives, over the network 122, an indication from the model storage system 102 that the computer-implemented predictive model 112 (that has been trained based upon private data of the user) is to be securely stored by the predictive application 208. The indication includes an identifier for the user and an identifier for the predictive model 112. The indication may also include the predictive model 112.

Upon receiving the indication, the predictive application 208 creates the file 222 within the data store 220 and marks the file 222 as "to-be-encrypted", wherein the file 222 is initially empty and unencrypted. The predictive application 208 also creates the metadata 226 for the predictive model 112. The OS 206 of the computing system 120 generates a content key (not shown in FIG. 1 or 2), in the memory 204 of the computing system 120, upon detecting that the file 222 has been marked as "to-be-encrypted". The OS 206 encrypts the learned parameters 114 of the predictive model 112 based upon the content key. The OS 206 transmits an encryption request to the predictive application 208, wherein the encryption request includes the content key.

Upon receiving the encryption request, the predictive application 208 obtains the model key 218, wherein the model key 218 is retained in the memory 204 of the computing system 120 (and not in the data store 220 of the computing system 120), and further wherein the model key 218 is unique to the predictive model 112. In one embodiment, the predictive application 208 generates the model key 218 in the memory 204 upon receiving the encryption request. In another embodiment, the predictive application 208 receives the model key 218 from the user computing device 230 over a secured and authenticated pipeline and stores the model key 218 in the memory 204. The predictive application 208 encrypts the content key based upon the model key 218, thereby generating the encrypted content key 228, and returns the encrypted content key 228 to the OS 206 of the computing system 120. The (original, unencrypted) content key is discarded by the OS upon providing the content key to the predictive application 208, and is further discarded by the predictive application 208 subsequent to the generation of the encrypted content key 228.

As the OS handles the encryption, the predictive application 208 can transmit the learned parameters 114 for storage in the encrypted file 222, and the OS encrypts the learned parameters 114 using the content key. The predictive application 208 also causes the unencrypted file 224 to be created, and the predictive application 208 writes the execution code 116 to the unencrypted file 224. As the execution code 116 is not encrypted, a developer is able to transparently view aspects of the predictive model 112 without compromising the privacy of the user. The OS 206 also causes the encrypted content key 228 to be stored in the metadata 226. Thus, the predictive model 112 (including the encrypted file 222 and the unencrypted file 224), and the metadata 226 (including the encrypted content key 228) are stored persistently in the data store 220.

Decryption of the encrypted learn parameters is now described. Upon receipt of a request to instantiate a model process for the predictive model 112, the predictive application 208 instantiates the model process 214 in the memory 204 of the computing system 120 based upon the execution code 116 stored in the unencrypted file 224, wherein the model process 214 is to be responsible for executing the predictive model 112 in order to generate a prediction. For instance, the predictive application 208 may instantiate the model process 214 upon receiving a request from the user computing device 230. The predictive application 208 also generates, in the memory 204 of the computing system 120, the model-process data 216. The model-process data 216 includes an identifier for the predictive model 112 and an identifier for the model process 214 instantiated in the memory 204, and wherein the identifier for the predictive model 112 is mapped to the identifier for the model process 214. It is to be understood that the above-described processes may be repeated for different predictive models associated with different users such that the data store 220 comprises a plurality of files, metadata for the files, and encrypted content keys for the files and such that the memory comprises a plurality of model processes, model keys for the different predictive models, and model-process data for the plurality of model processes/predictive models.

When the model process 214 is instantiated in the memory 204 of the computing system 120, the predictive application 208 causes the encrypted learned parameters 114 of the predictive model to be decrypted. With more specificity, upon instantiation, the model process 214 attempts to read from the encrypted file 222 stored in the data store 220. Upon the OS 206 of the computing system 120 detecting that the model process 214 is attempting to read from the encrypted file 222, the OS 206 transmits a decryption request to the predictive application 208. More specifically, the OS 206 loads the metadata 226 (including the encrypted content key 228) from the data store 220 into the memory 204, includes the identifier for the model process 214 and the metadata 226 in the decryption request, and transmits the decryption request to the predictive application 208.

The predictive application 208 identifies the predictive model 112 by performing a search over the model-process data 216 stored in the memory 204 of the computing system 120, wherein the search is based upon the encryption request. Upon identifying the predictive model 112, the predictive application 208 validates that the model process 214 has permission to read from the encrypted file 222 stored in the data store 220 based upon the model-process data 216 (which as noted above, maps an identifier for the predictive model 112 to an identifier for the model process 214).

Upon validating the model process 214, the predictive application 208 retrieves the model key 218 stored in the memory 204 based upon the model-process data 216 and the identifier for the model process 214 and/or the metadata 226. The predictive application 208 then decrypts the encrypted content key 228 (received from the OS 206 of the computing system 120) using the model key 218 that is stored in the memory 204, thereby generating the (decrypted) content key (not shown in FIG. 1 or 2) in the memory 204. The predictive application 208 transmits the content key to the OS 206 of the computing system 120. The OS 206 decrypts the encrypted file 222 (and hence, the learned parameters 114 of the predictive model 112) based upon the content key, and provides an indication thereof to the model process 214 instantiated in the memory 204 of the computing system 120. After decrypting the learned parameters 114 based upon the content key, the OS 206 may discard the content key (i.e., the OS 206 may not retain the decrypted content key in the memory 204 or the data store 220). As the learned parameters 114 are now readable by the model process 214, the model process 214 is able to execute the predictive model 112.

Subsequently, the predictive application 208 receives a query (a request for a prediction) from the user computing device 230. The query may originate from the user computing device 230, or a client computing device in communication with the user computing device 230 may generate the query, transmit the query to the user computing device 230, and the user computing device 230 may forward the query to the computing system 120. The query comprises an identifier for the predictive model 112 and an identifier for the user, as well as input data that is to be provided to the predictive model 112.

Upon receiving the query, the predictive application 208 authorizes the query. With more specificity, the predictive application 208 determines, based upon the identifier for the user included in the query (and the identifier for user that was received by the predictive application 208 when the predictive model 112 was encrypted), that the user is authorized to invoke the predictive model 112. Upon authorization of the query, the predictive 208 application then transmits the query to the model process 214, whereupon the model process 214 executes the query (i.e., generates the prediction). With more specificity, the model process 214 provides the input data to the predictive model 112 as input, and the predictive model 112 generates the prediction based upon the input values, the learned parameters 114, and the design parameters 118. The model process 214 returns the prediction to the predictive application 208, and the predictive application 208 outputs the prediction. In an example, the predictive application 208 may transmit, over the network 232, the prediction to the user computing device 230, whereupon the user computing device 230 may perform an action using the prediction. In one example where the user computing device 230 is operated by an individual user, the user computing device 230 may cause the prediction to be displayed to the individual user. In another example where the user computing device 230 is a server computing device, the user computing device 230 may forward the prediction to a client computing device operated by an individual user, whereupon the prediction may be displayed to the individual user on the client computing device. In yet another example, the user computing device 230 may identify content that is of interest to the user based upon the prediction, and the user computing device 230 may cause the content to be displayed to the user.

In an embodiment, the predictive application 208 may re-encrypt the learned parameters 114 of the predictive model 112 sometime after decryption of the learned parameters 114. With more specificity, the OS 206 may generate a new content key, a new file (that is to be encrypted), encrypt the learned parameters 114 with the new content key, store the encrypted parameters in the (encrypted) new file, and transmit an encryption request (including the new content key) to the predictive application 208, wherein the predictive application 208 can generate a new encrypted content key using the model key 218 (or a new model key). The predictive application 208 may return the new encrypted key to the OS 206, whereupon the OS 206 may store the new encrypted content key in the data store 220. In the event that old content key is used to read the new file or the new content key is used to read the old file, the new file or the old file, respectively may be corrupted and be rendered unreadable.

In an embodiment, if the computing system 120 is reset and/or loses power, the model-process data 216 and the model key 218 may be lost, as the model-process data 216 and the model key 218 are stored only in the (volatile) memory 204, and not in the data store 220 (or other computer-readable storage configured for persistent storage of data). Furthermore, the model-process 214 is de-instantiated if the computing system 120 is reset and/or loses power. Thus, in the event of a reset or a power loss, the (encrypted) learned parameters 114 of the predictive model 112 stored in the data store 220 are unable to be accessed (as the learned parameters require the model key 216 in order to be accessed), and hence the predictive model 112 is unable to be utilized to generate predictions. In order to utilize the predictive model 112 to generate predictions, the above-described encryption processes may be repeated.

It is to be understood that the predictive application 208 may receive a large volume of queries from the user computing device 230 (or from several computing devices associated with the user) with a period of time. In order to accommodate the large volume of queries, the predictive application 208 may instantiate a plurality of instances of the model process 214 and subdivide the queries among the instances for efficient processing of the queries.

Figure 3:
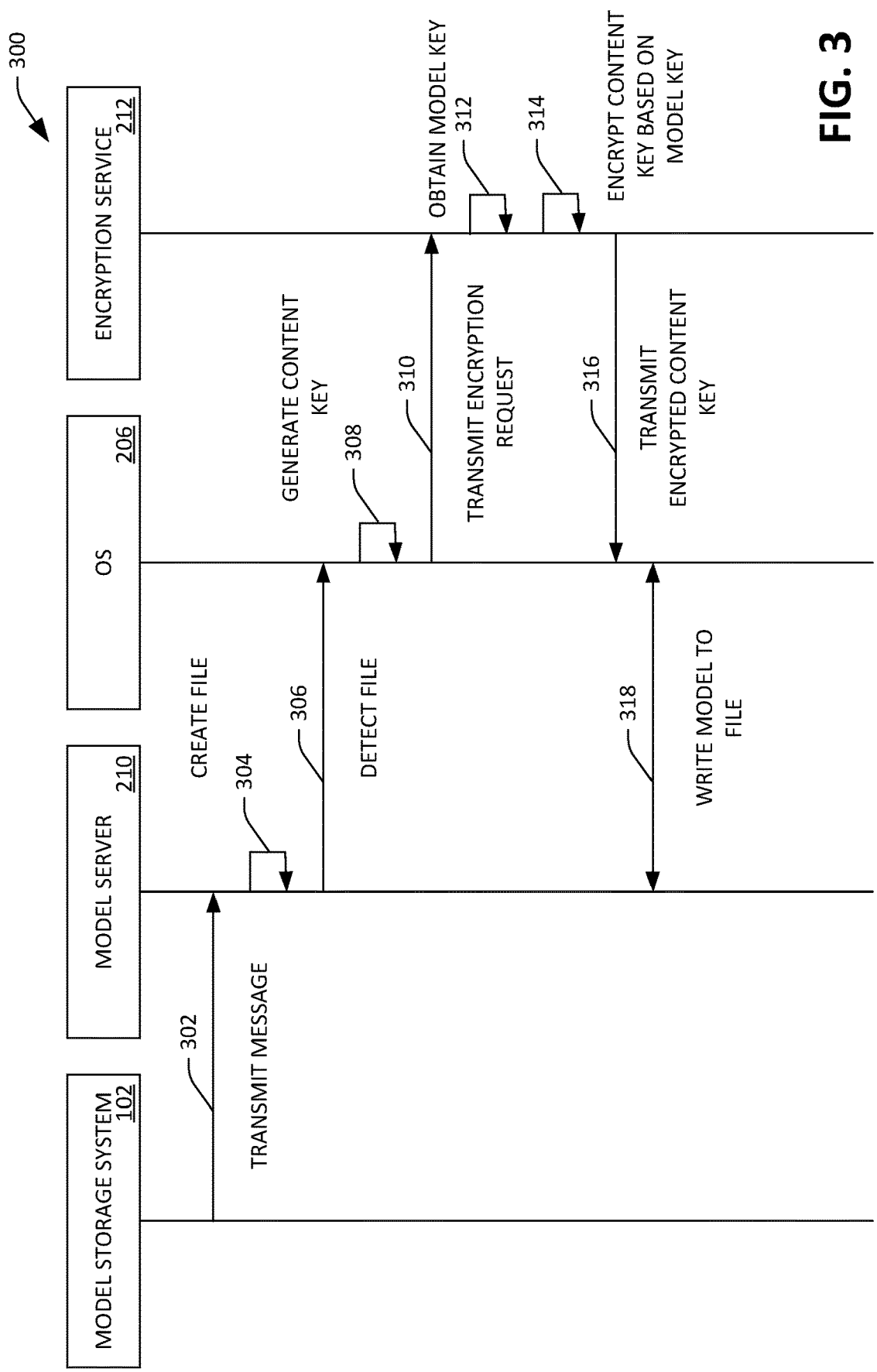
FIG. 3 is a communications flow diagram for encrypting parameters of a computer-implemented predictive model that has been trained based upon private data of a user.
Figure 4:
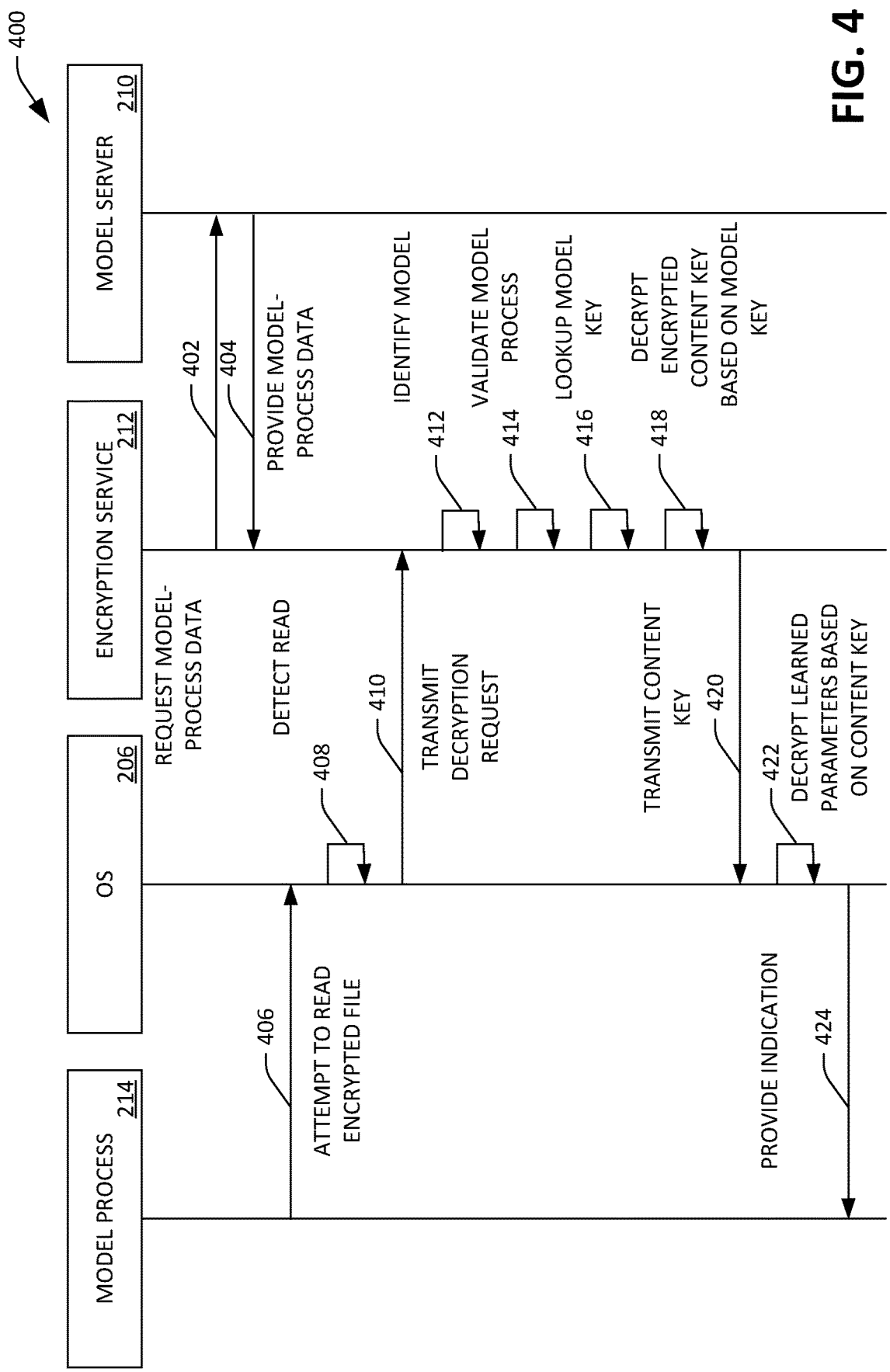
FIG. 4 is a communications flow diagram for decrypting parameters of a computer-implemented predictive model that has been trained based upon private data of a user.
Figure 5:
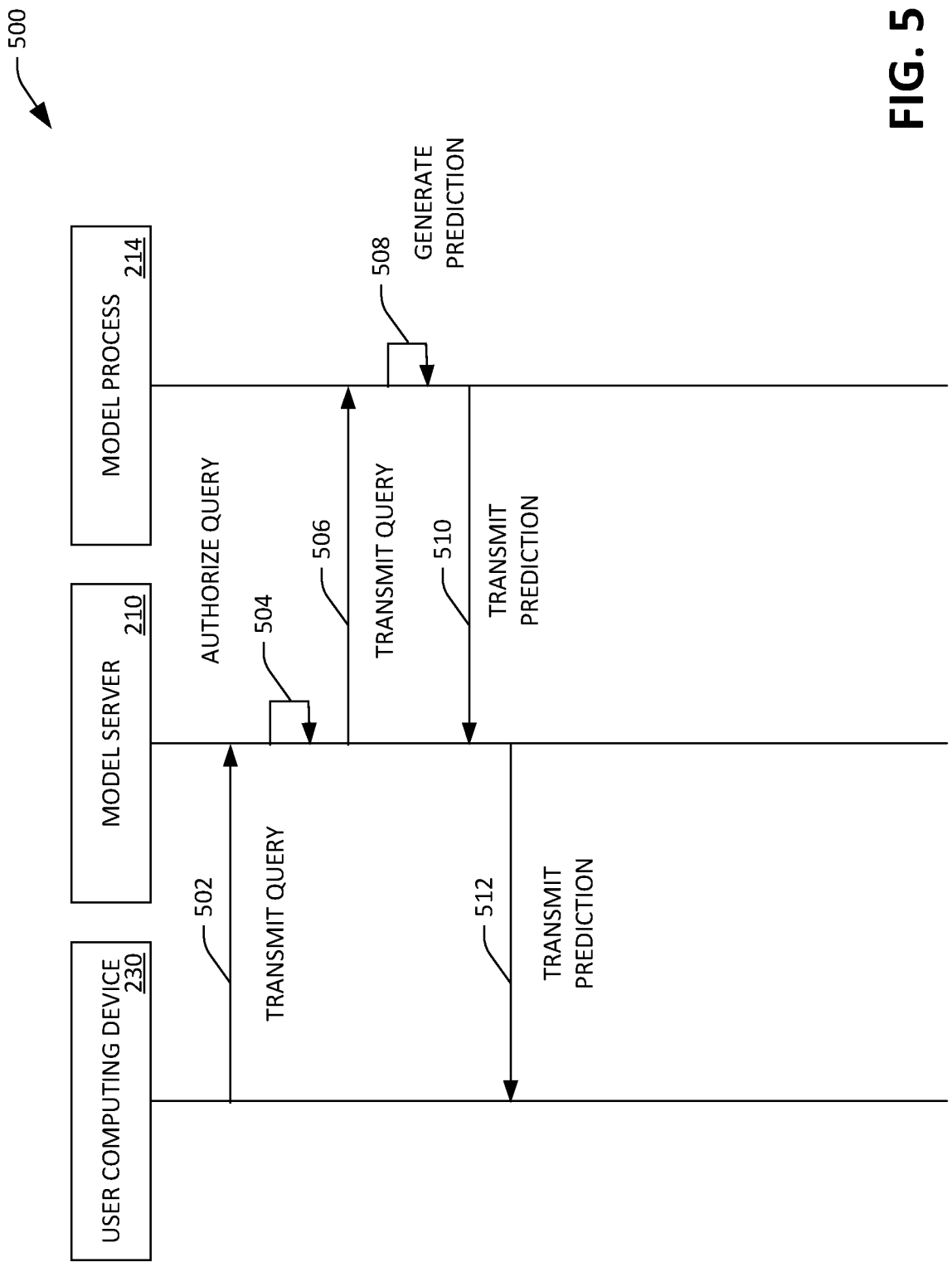
FIG. 5 is a communications flow diagram for generating a prediction by way of a computer-implemented predictive model that has been trained based upon private data of a user.

FIGS. 3-5 illustrate communications flow diagrams pertaining to securely storing and executing computer-implemented predictive models according to an embodiment. While the communications flow diagrams are shown and described as being a series of steps that are performed in a sequence, it is to be understood and appreciated that the communications flow is not limited by the order of the sequence. For example, some steps can occur in a different order than what is described herein. In addition, a step can occur concurrently with another step. Further, in some instances, not all steps may be required to implement the communications flows described herein.

Moreover, the steps described herein may be computer-executable instructions that can be implemented by one or more processors and/or stored on a computer-readable medium or media. The computer-executable instructions can include a routine, a sub-routine, programs, a thread of execution, and/or the like. Still further, results of steps of the communications flows can be stored in a computer-readable medium, displayed on a display device, and/or the like.

Referring specifically now to FIG. 3 and generally to FIGS. 1 and 2, a communications flow diagram 300 for encrypting learned parameters of a computer-implemented predictive model is illustrated. At step 302, the model storage system 102 transmits a message to the model server 210. The message includes an indication that the computer-implemented predictive model 112 is to be securely stored by the computing system 120. The message includes the predictive model 112. The message may also include an identifier for the user.

At step 304, upon receiving the message, the model server 210 creates the computer-readable file 222 in computer-readable storage (e.g., the data store 220) and marks the file 222 as "to-be-encrypted". The file 222 is initially empty and unencrypted. The model server 210 may also generate the metadata 226 for the predictive model 112.

At step 306, the OS 206 of the computing system 120 detects that the file 222 has been marked as "to-be-encrypted", and at step 308, the OS 206 generates, in the memory 204, a content key for the predictive model 112, and encrypts the learned parameters 114 of the predictive model 112 based upon the content key. In an embodiment, an encrypting file system (EFS) of the OS 206 of the computing system 120 generates the content key.

At step 310, the OS 206 of the computing system 120 transmits an encryption request to the encryption service 212. The encryption request includes the content key. In an embodiment, the EFS of the OS 206 performs an authorized remote procedure call (RPC) to a local security authority subsystem service (LSASS) provided by the OS 206. In the embodiment, the LSASS communicates with a custom key dynamic linked library (DLL) in order to perform the encryption request.

At step 312, upon receiving the encryption request, the encryption service 212 obtains the model key 218. In a first embodiment, the encryption service 212 obtains the model key 218 by generating the model key 218. In a second embodiment, the encryption service 212 obtains the model key 218 from a computing device associated with the user over a secured and authenticated pipeline. At step 314, the encryption service 212 encrypts the content key included in the encryption request based upon the model key 218, thereby generating the encrypted content key 228. After generation of the encrypted content key 228, the content key included in the encryption request is discarded (i.e., not retained in the memory 204 or in the data store 220). At step 316, the encryption service 212 transmits the encrypted content key 228 to the OS 206.

At step 318, the OS 206 and the model server 210 communicate with another to write the predictive model 112 to the file 222. With more specificity, the (encrypted) learned parameters 114 are written to the encrypted file 222 and the execution code 116 (including the design parameters 118) and are written to the unencrypted file 224. Thus, the predictive model 112 (including the encrypted file 222 and the unencrypted filed 224) is stored in the data store 220. The OS 206 and the model server 210 also communicate to store the metadata 226 (including the encrypted content key 228) persistently in the data store 220.

Turning specifically now to FIG. 4 and generally to FIGS. 1 and 2, a communications flow diagram 400 for decrypting learned parameters of a computer-implemented predictive model is illustrated. The decryption may occur upon instantiation of the model process 214. For instance, decryption may occur upon the model server 210 receiving an indication from a computing device associated with a user (e.g., the user computing device 230) that the learned parameters are to be decrypted. It is contemplated that the predictive model 112 (including the encrypted file 222 and the unencrypted file 224) and the metadata 226 (including the encrypted content key 228) have been stored in the data store 220 as described above in the description of the communication flow diagram 300 and that the model-process data 216 has been created in the memory 204.

At step 402, upon instantation of the model process 214, the encryption service 212 requests the model-process data 216 from the model server 210. At step 404, the model server 210 provides the model-process data 216 to the encryption service 212. At step 406, the model process 214 attempts to read from the encrypted file 222 stored in the data store 220 of the computing system 120. At step 408, the OS 206 of the computing system 120 detects that the model process 214 is attempting to read from the encrypted file 222 stored in the data store 220 of the computing system 120. The OS 206 obtains an identifier for the model process 214 based upon the attempted read performed by the model process 214.

At step 410, upon detecting that the model process 214 is attempting to read from the encrypted file 222, the OS 206 of the computing system 120 transmits a decryption request to the encryption service 212. With more specificity, the OS 206 loads the metadata 226 (including the encrypted content key 228) into the memory 204 from the data store 220, generates the decryption request in the memory 204, and transmits the decryption request to the encryption service 212, wherein the decryption request comprises the identifier for the model process 214 and the metadata 226 (including the encrypted content key 228). In an embodiment, the EFS of the OS 206 of the computing system 120 performs a RPC to the LSASS provided by the OS 206. In the embodiment, the LSASS communicates with the custom key DLL in order to perform the decryption request.

At step 412, the encryption service 212 identifies the predictive model 112 based upon the decryption request and the model-process data 216 stored in the memory 204 of the computing system 120. At step 414, the encryption service 212 validates that the model process 214 has permission to read from the encrypted file 222 based upon the model-process data 216. At step 416, upon validating the model process 214, the encryption service 212, based upon the decryption request and the model-process data 216, looks up the model key 218 that was used to generate the encrypted content key 228. At step 418, the encryption service 212 decrypts the encrypted content key 228 based upon the model key 218, thereby generating the (decrypted) content key. The encryption service 212 may remove the encrypted content key 228 from the memory 230 subsequent to generating the decrypted content key.

At step 420, the encryption service 212 transmits the content key to the OS 206 of the computing system 120. At step 422, the OS 206 decrypts the learned parameters 114 of the predictive model 112 based upon the content key. The computing system 120 may discard the content key after decrypting the learned parameters 114 (i.e., the content key is not retained in the memory 204 or the data store 220). At step 424, the OS 206 provides the model process 214 with an indication that the learned parameters 114 of the predictive model 112 have been decrypted. The model process 214 is now able to execute the predictive model 112.

With reference specifically now to FIG. 5 and generally to FIGS. 1 and 2, a communications flow diagram 500 for generating a prediction via a computer-implemented predictive model is illustrated. At step 502, the user computing device 230 transmits a query to the model server 210, wherein the query is a request for a prediction that is associated with the user. The query includes an identifier for the predictive model 112 and an identifier for the user, as well as input data. At step 504, the model server 210 authorizes the query. At step 506, upon the query being authenticated, the model server 210 transmits the query to the model process 214, wherein the model server 210 removes the identifier for the user from the query prior to transmitting the query to the model process 214. At step 508, the model process 214 generates the prediction based upon the predictive model 112 and the input data. With more specificity, the model process 214 provides the input data as input to the predictive model 112, and the predictive model 112 outputs the prediction based upon the (decrypted) learned parameters 114 of the predictive model 112, the design parameters 118 of the predictive model 112, and the input data. At step 510, the model process 214 transmits the prediction to the model server 210. At step 512, the model server 210 transmits the prediction to the user computing device 230.

Figure 6:
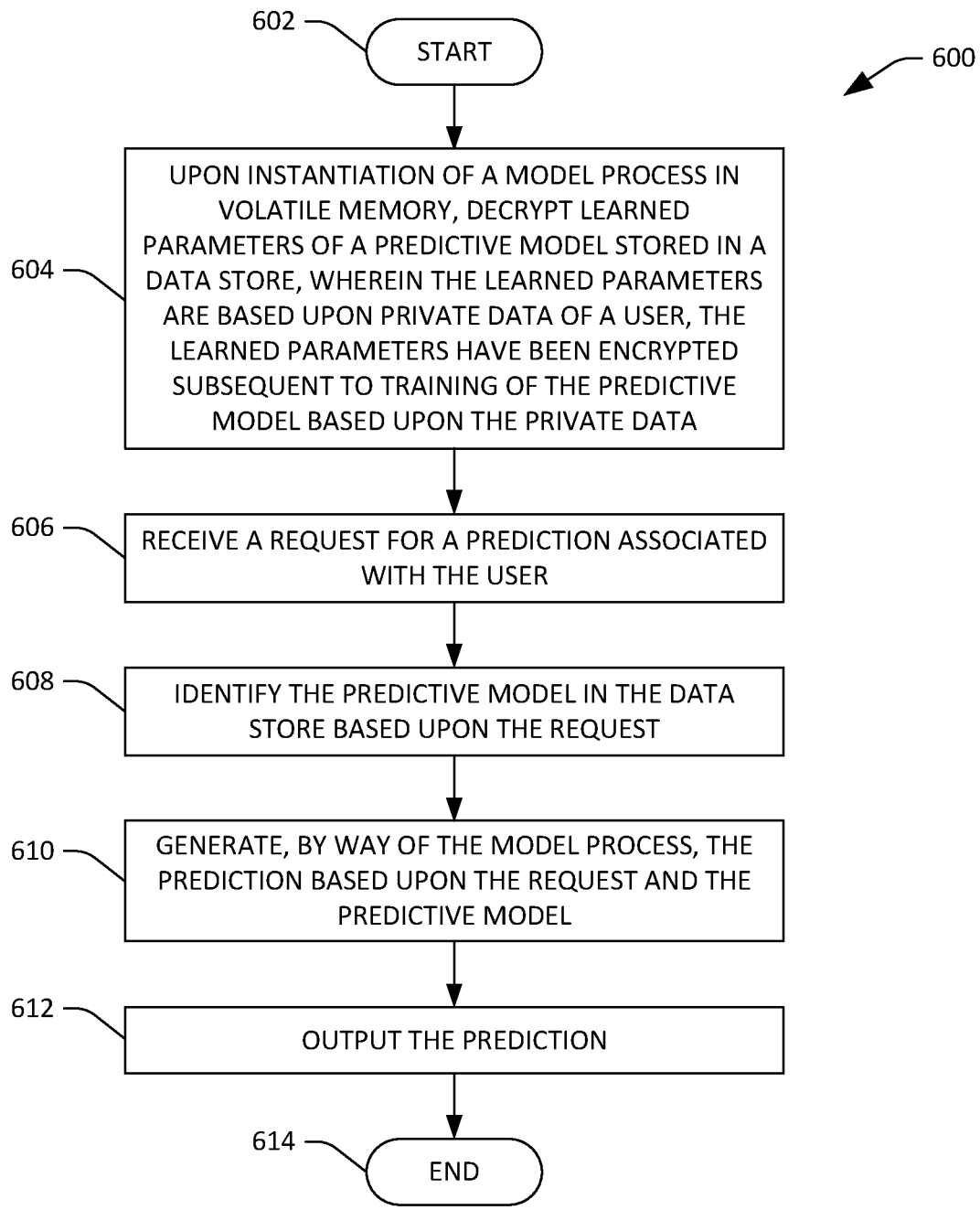
FIG. 6 is a flow diagram that illustrates an exemplary methodology executed by a computing system for generating a prediction by way of a computer-implemented predictive model that has been trained based upon private data of a user.
Figure 7:
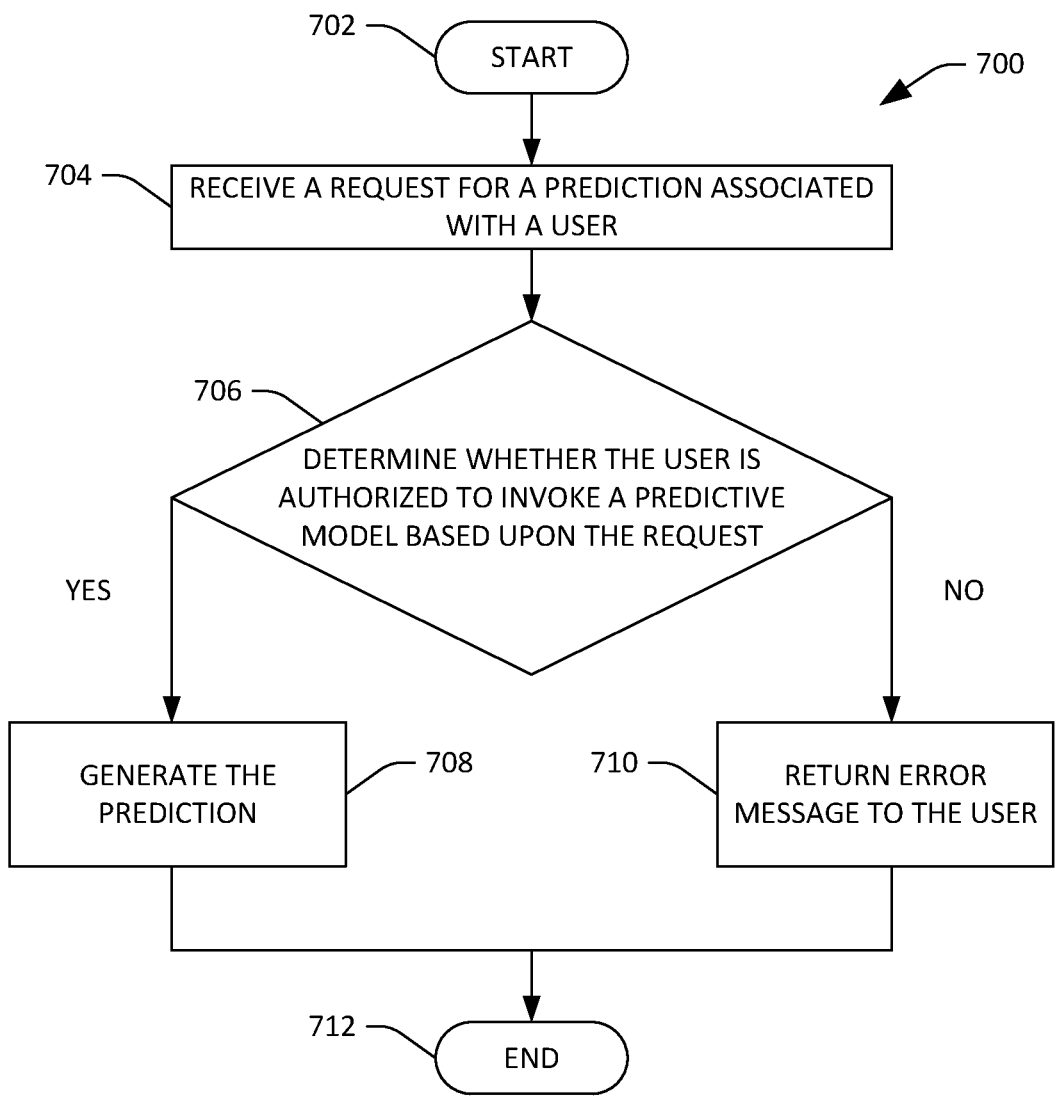
FIG. 7 is a flow diagram that illustrates an exemplary methodology executed by a computing system for authorizing a request for a prediction.

FIGS. 6 and 7 illustrate exemplary methodologies relating to securely managing access to a computer-implemented predictive model. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now to FIG. 6, a methodology 600 executed by a computing system that facilitates generating a prediction via a predictive model that has been trained based upon private data of a user is illustrated. The methodology 600 begins at 602, and at 604, upon instantiation of a model process in volatile memory of the computing system, the computing system decrypts learned parameters of a predictive model associated with a user. The learned parameters of the predictive model are stored a non-volatile data store. The learned parameters are based upon private data of the user. The learned parameters of the predictive model have been encrypted in the data store subsequent to training of the predictive model based upon the private data of the user. At 606, the computing system receives a request for a prediction associated with the user. At 608, the computing system identifies the predictive model based upon the request. At 610, the computing system generates, by way of the model process, the prediction based upon the request and the predictive model. At 612, the computing system outputs the prediction. The methodology 600 concludes at 614.

With reference now to FIG. 7, a methodology 700 performed by a computing system that facilitates authorizing a request for a prediction is illustrated. The methodology 700 begins at 702, and at 704, the computing system 700 receives a request for a prediction associated with a user, the request includes input data, an identifier for a predictive model of the user, and an identifier for the user. At 706, the computing system determines, based upon the request, whether the user is authorized to invoke the predictive model. At 708, upon positive determination, the computing system causes the predictive model to be executed based upon the input data. At 710, upon negative determination, the computing system returns an error message. The methodology 700 concludes at 712.

(A1) In one aspect, a method (e.g., 600) is executed by a processor (e.g., 802) of a computing system (e.g., 800). The method includes upon instantiation of a model process in volatile memory of the computing system, decrypting (e.g., 604) learned parameters (e.g., 114) of a computer-implemented predictive model (e.g., 112) stored in a computer-readable, non-volatile data store (e.g., 110), where the learned parameters are based upon private data of a user, and where the learned parameters have been encrypted subsequent to training of the computer-implemented predictive model based upon the private data of the user. The method further includes receiving (e.g., 606) a request for a prediction associated with the user; identifying (e.g., 608), based upon the request, the computer-implemented predictive model stored in the computer-readable, non-volatile data store; generating (e.g., 610), by way of the model process, the prediction based upon the request and the computer-implemented predictive model; and outputting (e.g., 612) the prediction to a computing device (e.g., 230) associated with the user.

(A2) The method of A1, further including: prior to instantiation of the model process, generating (e.g., 304) a file (e.g., 222) in the computer-readable, non-volatile data store, where the file is initially empty; marking the file with an indication that the file is to be encrypted; generating (e.g., 308), by an operating system (OS) (e.g., 206) of the computing system, a content key; encrypting the learned parameters based upon the content key; storing the encrypted learned parameters in the file; and encrypting (e.g., 314) the content key based upon a model key (e.g., 218) stored in volatile memory of the computing system, thereby generating an encrypted content key (e.g., 228); and storing the encrypted content key in the computer-readable, non-volatile data store.

(A3) The method of any of A1-A2, wherein decrypting the learned parameters of the computer-implemented predictive model comprises: retrieving, by the OS of the computing system and from the computer-readable, non-volatile data store, the encrypted content key; and decrypting (e.g., 418), by the OS of the computing system, the encrypted content key based upon the model key stored in the volatile memory of the computing system, thereby generating the content key, wherein the learned parameters of the computer-implemented predictive model are decrypted based upon the content key.

(A4) The method of any of A1-A3, wherein the request comprises an identifier for the computer-implemented predictive model and an identifier for the user, wherein identifying the computer-implemented predictive model is based upon the identifier for the computer-implemented predictive model and the identifier for the user.

(A5) The method of any of A1-A4, wherein the prediction is utilized to identify content that is of interest to the user.

(A6) The method of any of A1-A5, wherein the request is received from a second computing device, wherein the computing device is operated by the user, wherein outputting the prediction to the computing device comprises transmitting the prediction to the second computing device, wherein the second computing device transmits the prediction to the computing device.

(A7) The method of any of A1-A6, wherein the computer-implemented predictive model further includes design parameters (e.g., 118) that are not based upon the private data of the user, the design parameters being specified by a developer of the computer-implemented predictive model, wherein the design parameters are unencrypted.

(B1) In another aspect, a computing system (e.g., 120) includes a processor (e.g., 202) and volatile memory (e.g., 204) storing instructions that, when executed by the processor, cause the processor to perform any of the methods described herein (e.g., any of A1-A7).

(C1) In yet another aspect, a non-transitory computer-readable storage medium includes instructions that, when executed by a processor (e.g., 802 of a computing system (e.g., 800), cause the processor to perform any of the methods described herein (e.g., any of A1-A7).

(D1) In another aspect, a method executed by a computing system (e.g., 120) that comprises a processor (e.g., 202) and volatile memory (e.g., 204) is described herein, wherein the method comprises: upon instantiation of a model process (e.g., 214) in the volatile memory, decrypting (e.g., 422) learned parameters (e.g., 114) of a computer-implemented predictive model (e.g., 112) stored in a computer-readable, non-volatile data store (e.g., 220), wherein the learned parameters are based upon private data of a user, wherein the learned parameters have been encrypted subsequent to training of the computer-implemented predictive model based upon the private data of the user; receiving (e.g., 502) a request for a prediction associated with the user; upon authorizing (e.g., 504) the request, identifying, based upon the request, the computer-implemented predictive model stored in the computer-readable, non-volatile data store; generating (e.g., 508), by way of the model process, the prediction based upon the request and the computer-implemented predictive model; and outputting the prediction to a computing device (e.g., 23) associated with the user.

(D2) The method of D1, wherein the computer-implemented predictive model further includes computer-executable code (e.g., 116), wherein the computer-executable code of the computer-implemented predictive model, when stored in the computer-readable, non-volatile data store, is unencrypted, while the learned parameters, when stored in the computer-readable, non-volatile data store, are encrypted.

(D3) The method of any of D1-D2, further comprising: prior to instantiation of the model process in the volatile memory, receiving the computer-implemented predictive model, wherein the learned parameters of the computer-implemented predictive model are unencrypted when the computer-implemented predictive model is received; encrypting the learned parameters of the computer-implemented predictive model; and storing the computer-implemented predictive model in the computer-readable, non-volatile data store with the learned parameters being encrypted.

(D4) The method of any of D1-D3, wherein the learned parameters of the computer-implemented predictive model are encrypted based upon a content key generated by an operating system (OS) (e.g., 206) of the computing system. The method further comprises: subsequent to encrypting the learned parameters of the computer-implemented predictive model based upon the content key, encrypting (e.g., 314) the content key based upon a model key (e.g., 218) that is stored in the volatile memory of the computing system, thereby generating an encrypted content key; and storing the encrypted content key in the computer-readable, non-volatile data store.

(D5) The method of any of D1-D4, wherein decrypting the learned parameters of the computer-implemented predictive model comprises: retrieving, by the OS of the computing system and from the computer-readable, non-volatile data store, the encrypted content key; and decrypting the encrypted content key (e.g., 418) based upon the model key stored in the volatile memory of the computing system, thereby generating the content key, wherein the learned parameters of the computer-implemented predictive model are decrypted based upon the content key.

(D6) The method of any of D1-D5, wherein the request comprises input data associated with the user, wherein generating the prediction comprises inputting the input data to the computer-implemented predictive model, wherein the computer-implemented predictive model generates the prediction based upon the input data and the learned parameters.

(D7) The method of any of D1-D6, wherein outputting the prediction to the computing device associated with the user comprises transmitting the prediction to the computing device for presentment on a display.

(D8) The method of any of D1-D7, wherein the user is an individual user, wherein the private data of the user comprises data that has been received by a website visited by the individual user.

(D9) The method of any of D1-D8. The method further comprises: subsequent to outputting the prediction, re-encrypting the learned parameters of the computer-implemented predictive model.

(D10) The method of any of D1-D9, wherein the computer-implemented predictive model is a deep neural network comprising nodes and edges connecting the nodes, wherein the learned parameters of the computer-implemented predictive model are weights assigned to the edges, the weights being learned based upon the private data of the user.

(E1) In another aspect, a computing system (e.g., 120) comprises: a processor (e.g., 202); and volatile memory (e.g., 204) storing instructions that, when executed by the processor, cause the processor to perform any of the methods of D1-D10.

(F1) In yet another aspect, a non-transitory computer-readable storage medium includes instructions that, when executed by a processor (e.g., 802) of a computing system (e.g., 800), cause the processor to perform any of the methods of D1-D10.

(G1) In another aspect, a method executed by a computing system (e.g., 120) that comprises a processor (e.g., 202) and volatile (204) is described herein, wherein the method comprises: upon instantiation of a model process (e.g., 214) by the processor, decrypting (e.g., 422) learned parameters (e.g., 114) of a computer-implemented predictive model (e.g., 112) stored in a computer-readable, non-volatile data store (e.g., 220), wherein the learned parameters are based upon private data of a user, wherein the learned parameters have been encrypted subsequent to training of the computer-implemented predictive model based upon the private data of the user; receiving a request for a prediction associated with the user; identifying, based upon the request, the computer-implemented predictive model stored in a computer-readable, non-volatile data store; generating, by way of the model process, the prediction based upon the request and the computer-implemented predictive model; and transmitting the prediction to a computing device (e.g., 230) associated with the user.

(G2) The method of G1, wherein the user is an organization.

(G3) The non-transitory computer-readable storage medium of any of G1-G2, wherein decrypting (e.g., 422) the learned parameters of the computer-implemented predictive model is performed by an operating system (OS) (e.g., 206) of the computing system.

(H1) In another aspect, a computing system (e.g., 120) comprises: a processor (e.g., 202); and volatile memory (e.g., 204) storing instructions that, when executed by the processor, cause the processor to perform any of the methods of G1-G3.

(I1) In yet another aspect, a non-transitory computer-readable storage medium includes instructions that, when executed by a processor (e.g., 802) of a computing system, (e.g., 800), cause the processor to perform any of the methods of G1-G3.

Figure 8:
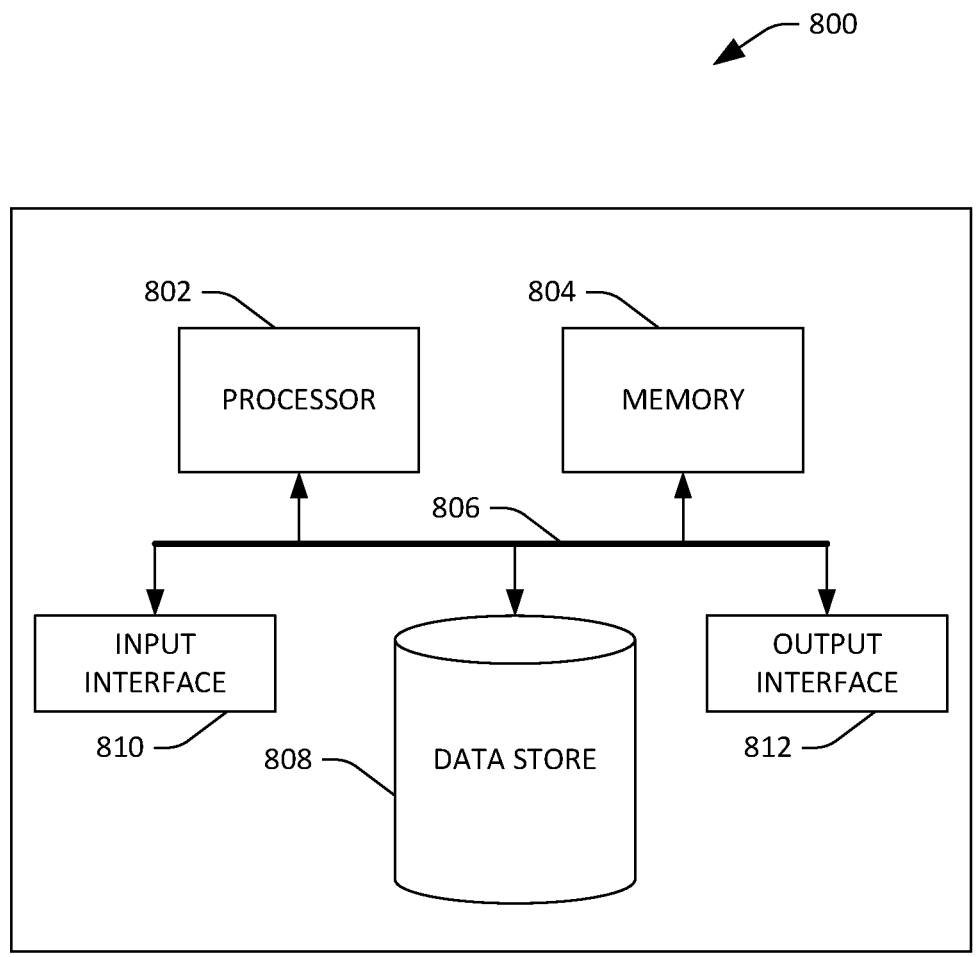
FIG. 8 is an exemplary computing device.

Referring now to FIG. 8, a high-level illustration of an exemplary computing device 800 that can be used in accordance with the systems and methodologies disclosed herein is illustrated. For instance, the computing device 800 may be used in a system that generates a prediction by way of a computer-implemented predictive model. By way of another example, the computing device 800 can be used in a system that encrypts parameters of a computer-implemented predictive model that have been generated based upon private data of a user. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store files, model-process data, model keys, predictive models, metadata for the predictive models, encrypted content keys, decrypted content keys, etc.

The computing device 800 additionally includes a data store 808 that is accessible by the processor 802 by way of the system bus 806. The data store 808 may include executable instructions, files, model-process data, model keys, predictive models, metadata for the predictive models, encrypted content keys, decrypted content keys, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise random-access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "application" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
    a processor; and
    volatile memory storing instructions that, when executed by the processor, cause the processor to perform acts comprising:
        upon instantiation of a model process in the volatile memory, decrypting learned parameters of a computer-implemented predictive model stored in a computer-readable, non-volatile data store, wherein the learned parameters are based upon private data of a user, wherein the learned parameters have been encrypted subsequent to training of the computer-implemented predictive model based upon the private data of the user;
        receiving a request for a prediction associated with the user;
        upon authorizing the request, identifying, based upon the request, the computer-implemented predictive model stored in the computer-readable, non-volatile data store;
        generating, by way of the model process, the prediction based upon the request and the computer-implemented predictive model; and
        outputting the prediction to a computing device associated with the user.

2. The computing system of claim 1, wherein the computer-implemented predictive model further includes computer-executable code, wherein the computer-executable code of the computer-implemented predictive model, when stored in the computer-readable, non-volatile data store, is unencrypted, while the learned parameters, when stored in the computer-readable, non-volatile data store, are encrypted.

3. The computing system of claim 1, the acts further comprising:
    prior to instantiation of the model process in the volatile memory, receiving the computer-implemented predictive model, wherein the learned parameters of the computer-implemented predictive model are unencrypted when the computer-implemented predictive model is received;

encrypting the learned parameters of the computer-implemented predictive model; and
storing the computer-implemented predictive model in the computer-readable, non-volatile data store with the learned parameters being encrypted.

4. The computing system of claim 3, wherein the learned parameters of the computer-implemented predictive model are encrypted based upon a content key generated by an operating system (OS) of the computing system, the acts further comprising:
subsequent to encrypting the learned parameters of the computer-implemented predictive model based upon the content key, encrypting the content key based upon a model key that is stored in the volatile memory of the computing system, thereby generating an encrypted content key; and
storing the encrypted content key in the computer-readable, non-volatile data store.

5. The computing system of claim 4, wherein decrypting the learned parameters of the computer-implemented predictive model comprises:
retrieving, by the OS of the computing system and from the computer-readable, non-volatile data store, the encrypted content key; and
decrypting the encrypted content key based upon the model key stored in the volatile memory of the computing system, thereby generating the content key, wherein the learned parameters of the computer-implemented predictive model are decrypted based upon the content key.

6. The computing system of claim 1, wherein the request comprises input data associated with the user, wherein generating the prediction comprises inputting the input data to the computer-implemented predictive model, wherein the computer-implemented predictive model generates the prediction based upon the input data and the learned parameters.

7. The computing system of claim 1, wherein outputting the prediction to the computing device associated with the user comprises transmitting the prediction to the computing device for presentment on a display.

8. The computing system of claim 1, wherein the user is an individual user, wherein the private data of the user comprises data that has been received by a website visited by the individual user.

9. The computing system of claim 1, the acts further comprising:
subsequent to outputting the prediction, re-encrypting the learned parameters of the computer-implemented predictive model.

10. The computing system of claim 1, wherein the computer-implemented predictive model is a deep neural network comprising nodes and edges connecting the nodes, wherein the learned parameters of the computer-implemented predictive model are weights assigned to the edges, the weights being learned based upon the private data of the user.

11. A method executed by a processor of a computing system, comprising:
upon instantiation of a model process in volatile memory of the computing system, decrypting learned parameters of a computer-implemented predictive model stored in a computer-readable, non-volatile data store, wherein the learned parameters are based upon private data of a user, wherein the learned parameters have been encrypted subsequent to training of the computer-implemented predictive model based upon the private data of the user;
receiving a request for a prediction associated with the user;
identifying, based upon the request, the computer-implemented predictive model stored in the computer-readable, non-volatile data store;
generating, by way of the model process, the prediction based upon the request and the computer-implemented predictive model; and
outputting the prediction to a computing device associated with the user.

12. The method of claim 11, further comprising:
prior to instantiation of the model process, generating a file in the computer-readable, non-volatile data store, wherein the file is initially empty;
marking the file with an indication that the file is to be encrypted;
generating, by an operating system (OS) of the computing system, a content key;
encrypting the learned parameters based upon the content key;
storing the encrypted learned parameters in the file; and
encrypting the content key based upon a model key stored in volatile memory of the computing system, thereby generating an encrypted content key; and
storing the encrypted content key in the computer-readable, non-volatile data store.

13. The method of claim 12, wherein decrypting the learned parameters of the computer-implemented predictive model comprises:
retrieving, by the OS of the computing system and from the computer-readable, non-volatile data store, the encrypted content key; and
decrypting, by the OS of the computing system, the encrypted content key based upon the model key stored in the volatile memory of the computing system, thereby generating the content key, wherein the learned parameters of the computer-implemented predictive model are decrypted based upon the content key.

14. The method of claim 11, wherein the request comprises an identifier for the computer-implemented predictive model and an identifier for the user, wherein identifying the computer-implemented predictive model is based upon the identifier for the computer-implemented predictive model and the identifier for the user.

15. The method of claim 11, wherein the prediction is utilized to identify content that is of interest to the user.

16. The method of claim 11, wherein the request is received from a second computing device, wherein the computing device is operated by the user, wherein outputting the prediction to the computing device comprises transmitting the prediction to the second computing device, wherein the second computing device transmits the prediction to the computing device.

17. The method of claim 11, wherein the computer-implemented predictive model further includes design parameters that are not based upon the private data of the user, the design parameters being specified by a developer of the computer-implemented predictive model, wherein the design parameters are unencrypted.

18. A non-transitory computer-readable storage medium comprising instructions that, when executed by a processor of a computing system, cause the processor to perform acts comprising:

upon instantiation of a model process by the processor, decrypting learned parameters of a computer-implemented predictive model stored in a computer-readable, non-volatile data store, wherein the learned parameters are based upon private data of a user, wherein the learned parameters have been encrypted subsequent to training of the computer-implemented predictive model based upon the private data of the user;

receiving a request for a prediction associated with the user;

identifying, based upon the request, the computer-implemented predictive model stored in the computer-readable, non-volatile data store;

generating, by way of the model process, the prediction based upon the request and the computer-implemented predictive model; and transmitting the prediction to a computing device associated with the user.

19. The non-transitory computer-readable storage medium of claim 18, wherein the user is an organization.

20. The non-transitory computer-readable storage medium of claim 18, wherein decrypting the learned parameters of the computer-implemented predictive model is performed by an operating system (OS) of the computing system.

* * * * *